(12) United States Patent
Omi et al.

(10) Patent No.: US 10,361,560 B2
(45) Date of Patent: Jul. 23, 2019

(54) POWER SYSTEM CONTROL INSTRUCTION DEVICE AND METHOD FOR CONTROLLING A VOLTAGE OF A POWER SYSTEM

(71) Applicant: Hitachi, Ltd., Chiyoda-ku, Tokyo (JP)

(72) Inventors: Shota Omi, Tokyo (JP); Masatoshi Kumagai, Tokyo (JP); Kenichiro Yamane, Tokyo (JP); Masahiro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 15/129,721

(22) PCT Filed: Mar. 31, 2014

(86) PCT No.: PCT/JP2014/059392
§ 371 (c)(1),
(2) Date: Sep. 27, 2016

(87) PCT Pub. No.: WO2015/151143
PCT Pub. Date: Oct. 8, 2015

(65) Prior Publication Data
US 2017/0141572 A1 May 18, 2017

(51) Int. Cl.
*H02J 3/12* (2006.01)
*H02J 13/00* (2006.01)
*G05B 17/02* (2006.01)

(52) U.S. Cl.
CPC ............... *H02J 3/12* (2013.01); *G05B 17/02* (2013.01); *H02J 13/0006* (2013.01)

(58) Field of Classification Search
None
See application file for complete search history.

(56) References Cited

U.S. PATENT DOCUMENTS 5,760,492 A * 6/1998 Kanoi .................. H02J 3/06
307/18
8,254,928 B2 * 8/2012 Watanabe .......... H04W 36/30
455/414.1

(Continued)

FOREIGN PATENT DOCUMENTS

JP      2009-65788 A      3/2009
JP      2011-217581 A    10/2011
WO   WO 2014/010030 A1   1/2014

OTHER PUBLICATIONS

International Search Report (PCT/ISA/210) issued in PCT Application No. PCT/JP2014/059392 dated Jun. 3, 2014 with English-language translation (two (2) pages).

*Primary Examiner* — Van H Nguyen
(74) *Attorney, Agent, or Firm* — Crowell & Moring LLP

(57) ABSTRACT

A power system control instruction device performing a control instruction to the control device that controls the power system on the basis of a measured value transmitted from a sensor measuring a state value of the power system and a method for performing such a control instruction are provided. The device obtains a centralized control amount using a measured value of the sensor such that a system voltage meets a predetermined control purpose, and creates a distributed control model using the measured value and the centralized control amount. The device then determines whether or not a voltage deviation from the voltage appropriate range occurs when the control device performs control on the basis of the distributed control model, and re-creates the distributed control model when the voltage deviation occurs, and transmits the distributed control model that is re-created to the control device.

8 Claims, 23 Drawing Sheets

(56) References Cited

U.S. PATENT DOCUMENTS

| | | | |
|---|---|---|---|
| 9,001,480 B2* | 4/2015 | Sato | H02M 7/00 |
| | | | 361/65 |
| 9,377,803 B2* | 6/2016 | Watanabe | G05F 1/70 |
| 9,774,216 B2* | 9/2017 | Yamane | H02J 3/12 |
| 9,780,563 B2* | 10/2017 | Kumagai | H02J 3/16 |
| 2015/0142187 A1 | 5/2015 | Yamane et al. | |

* cited by examiner

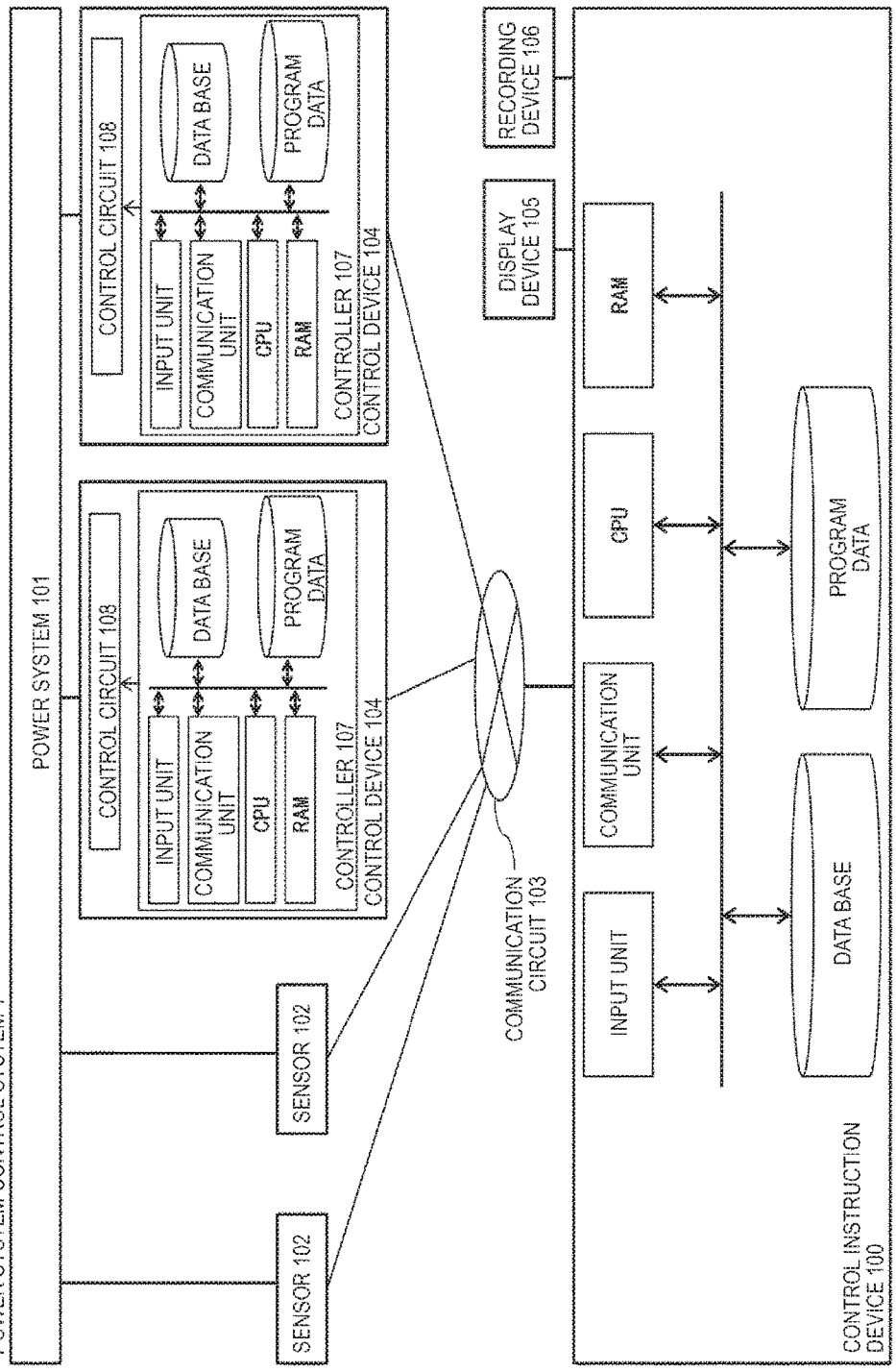
[Fig. 1]

[Fig. 2]
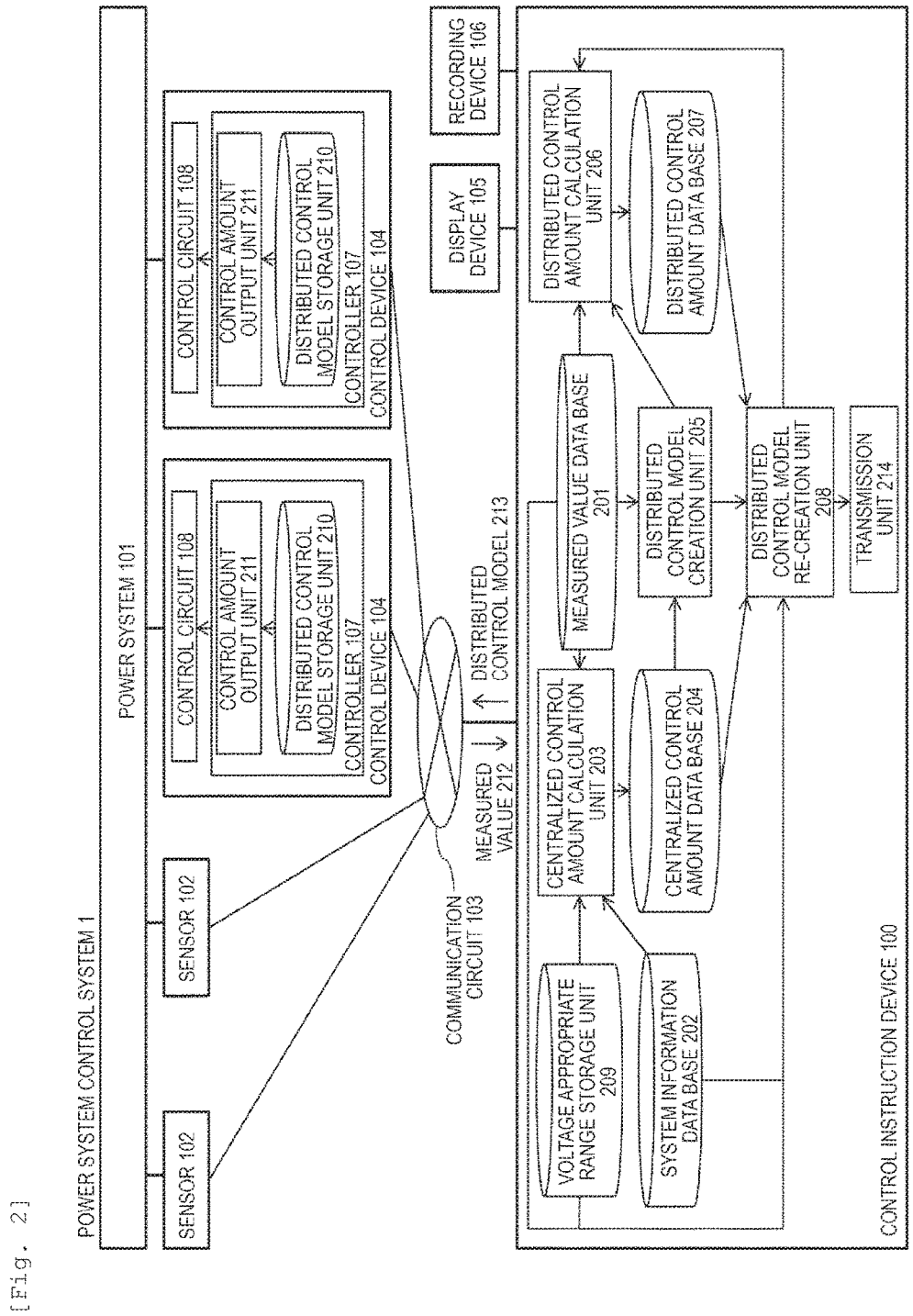

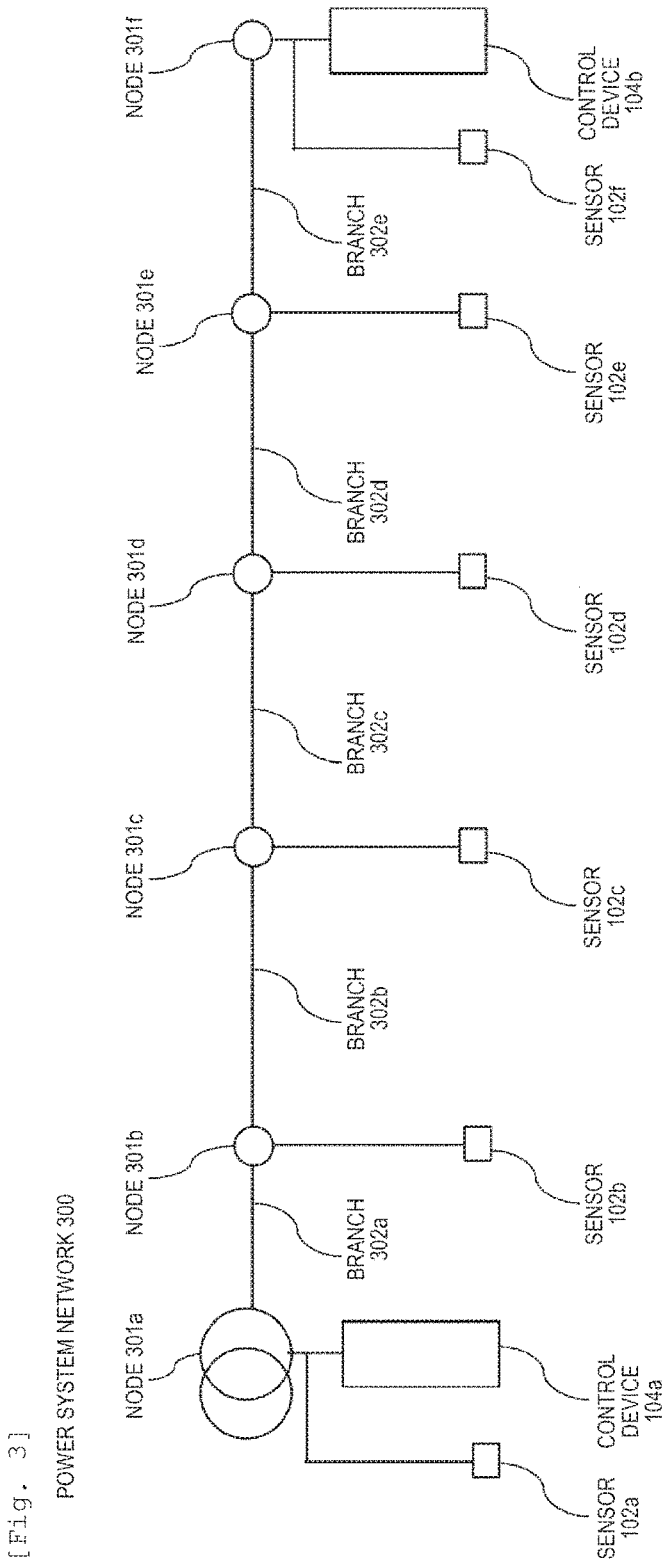

[Fig. 4]

MEASURED VALUE ACCUMULATION DATA

| NUMBER OF SENSOR | NUMBER OF NODE | OBTAINED TIME AND DATE | ACTIVE POWER [kW] | REACTIVE POWER [kvar] |
|---|---|---|---|---|
| SENSOR 102a | NODE 301a | 2012/12/10 15:30 | 750 | 70 |
| SENSOR 102b | NODE 301b | 2012/12/10 15:30 | 290 | 10 |
| SENSOR 102c | NODE 301d | 2012/12/10 15:30 | 180 | 15 |
| SENSOR 102d | NODE 301d | 2012/12/10 15:30 | 100 | 25 |
| SENSOR 102e | NODE 301e | 2012/12/10 15:30 | -20 | 10 |
| SENSOR 102f | NODE 301f | 2012/12/10 15:30 | 160 | -3 |
| SENSOR 102a | NODE 301a | 2012/12/10 15:00 | 800 | 75 |
| ... | ... | ... | ... | ... |

[Fig. 5]
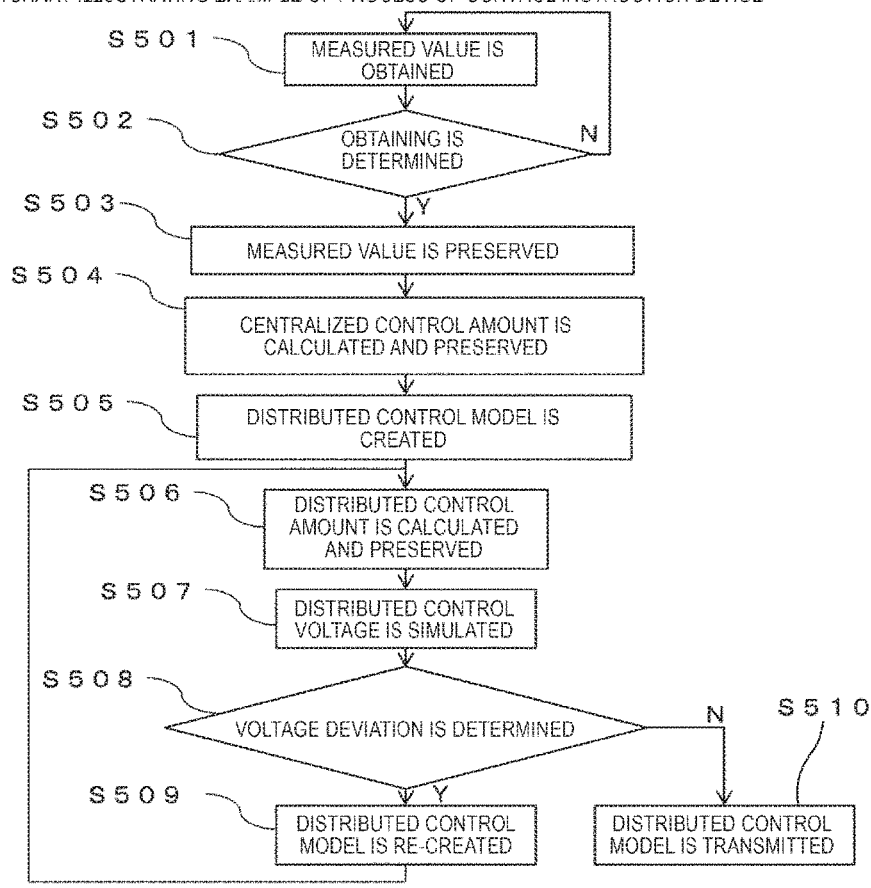

[Fig. 6]

VOLTAGE APPROPRIATE RANGE

| NUMBER OF NODE | VOLTAGE UPPER LIMIT [V] | VOLTAGE LOWER LIMIT [V] |
| --- | --- | --- |
| NODE 301a | 6750 | 6450 |
| NODE 301b | 6750 | 6450 |
| NODE 301c | 6750 | 6450 |
| NODE 301d | 6750 | 6450 |
| NODE 301e | 6750 | 6450 |
| NODE 301f | 6750 | 6450 |

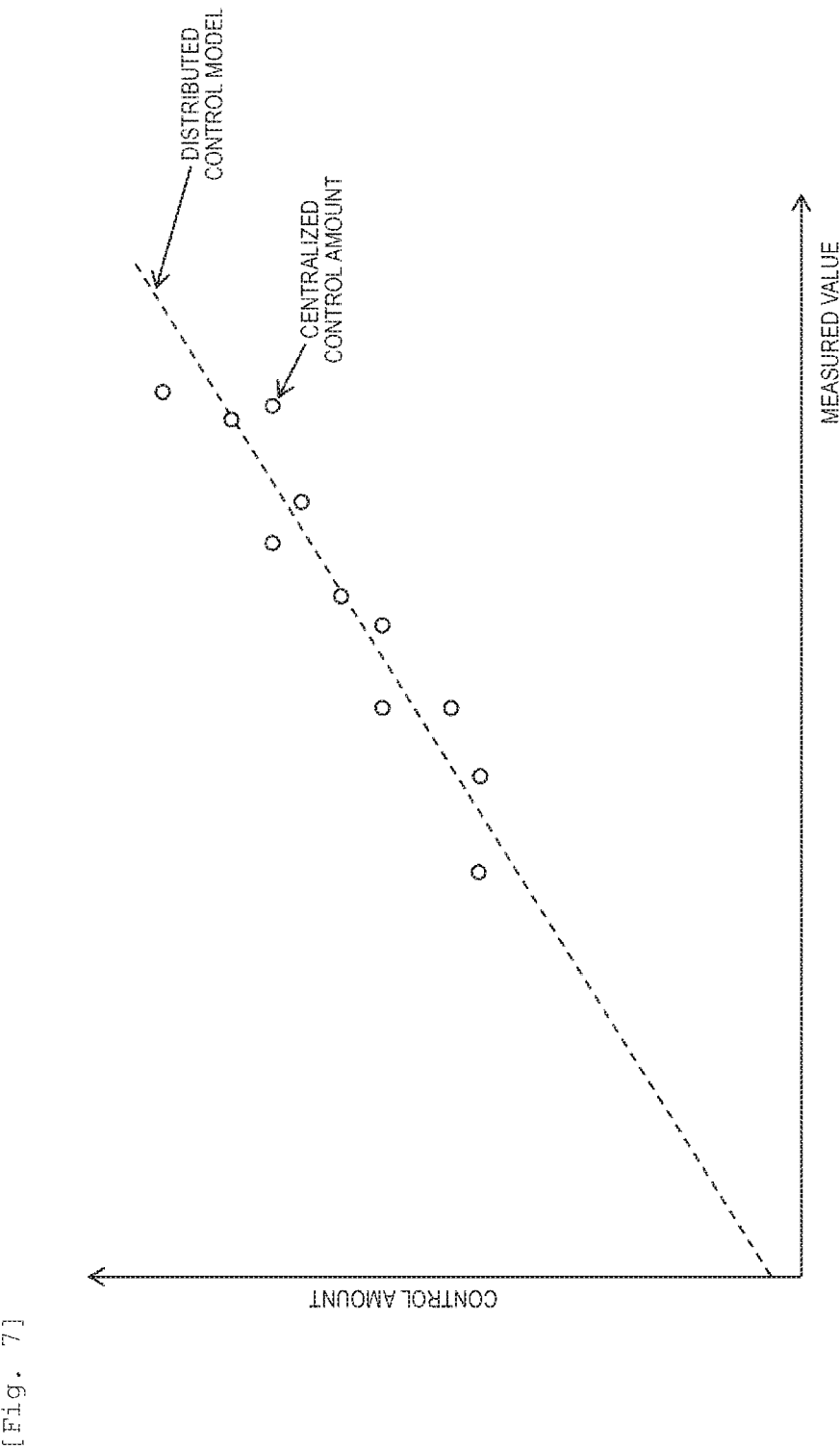
[Fig. 7]

[Fig. 8]

DISTRIBUTED CONTROL MODEL

| CONTROL DEVICE | NUMBER OF NODE | COEFFICIENT DATA | | CONSTANT TERM |
|---|---|---|---|---|
| 104a | NODE 301a | A | B | C |
| NUMBER OF MEASUREMENT NODE | NODE 301a | 3.0 | −1.8 | 250 |
| | NODE 301b | 1.2 | 0.1 | |
| | NODE 301c | −1.5 | −0.1 | |
| | ... | ... | ... | |

[Fig. 9]
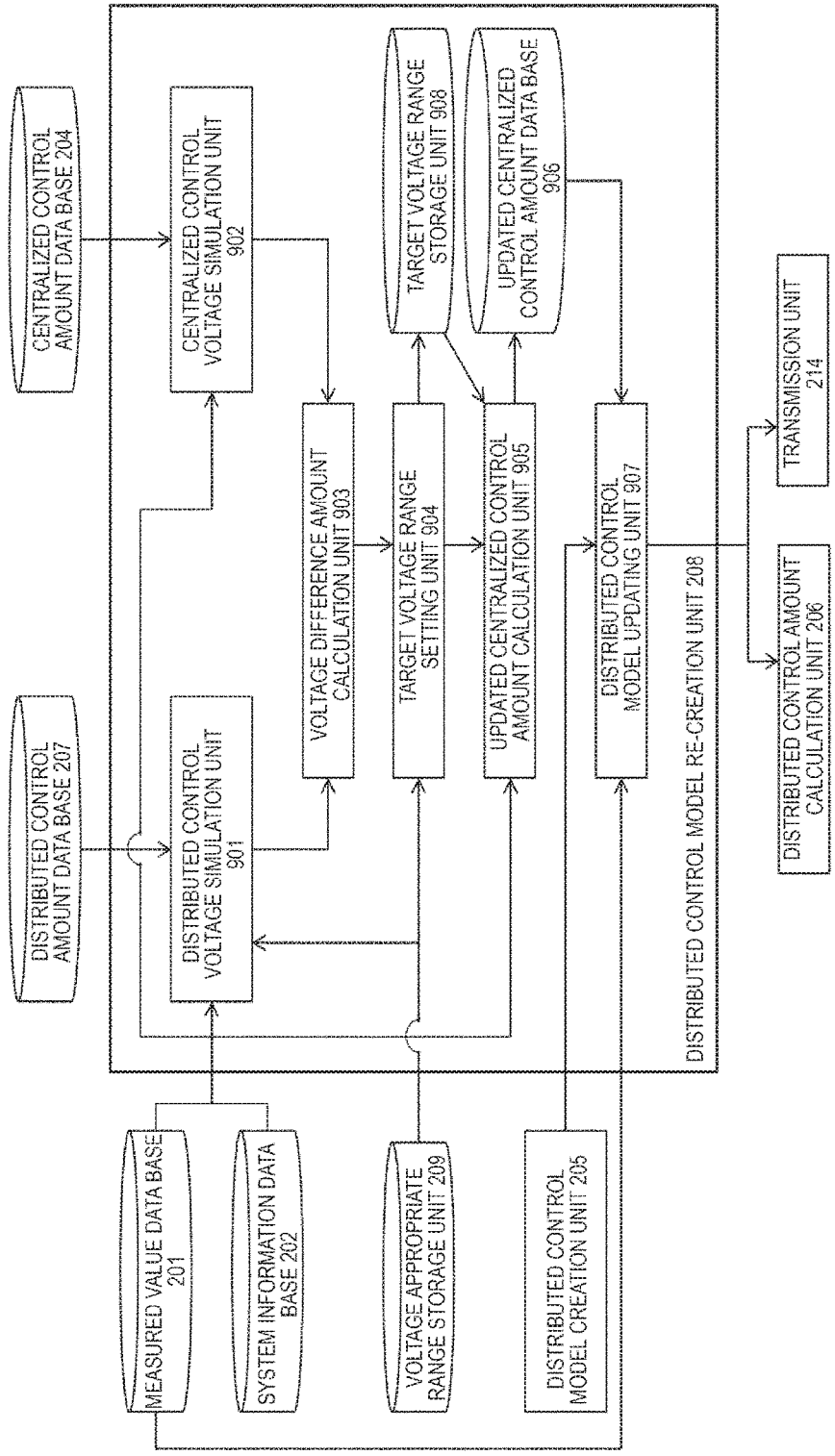

[Fig. 10]
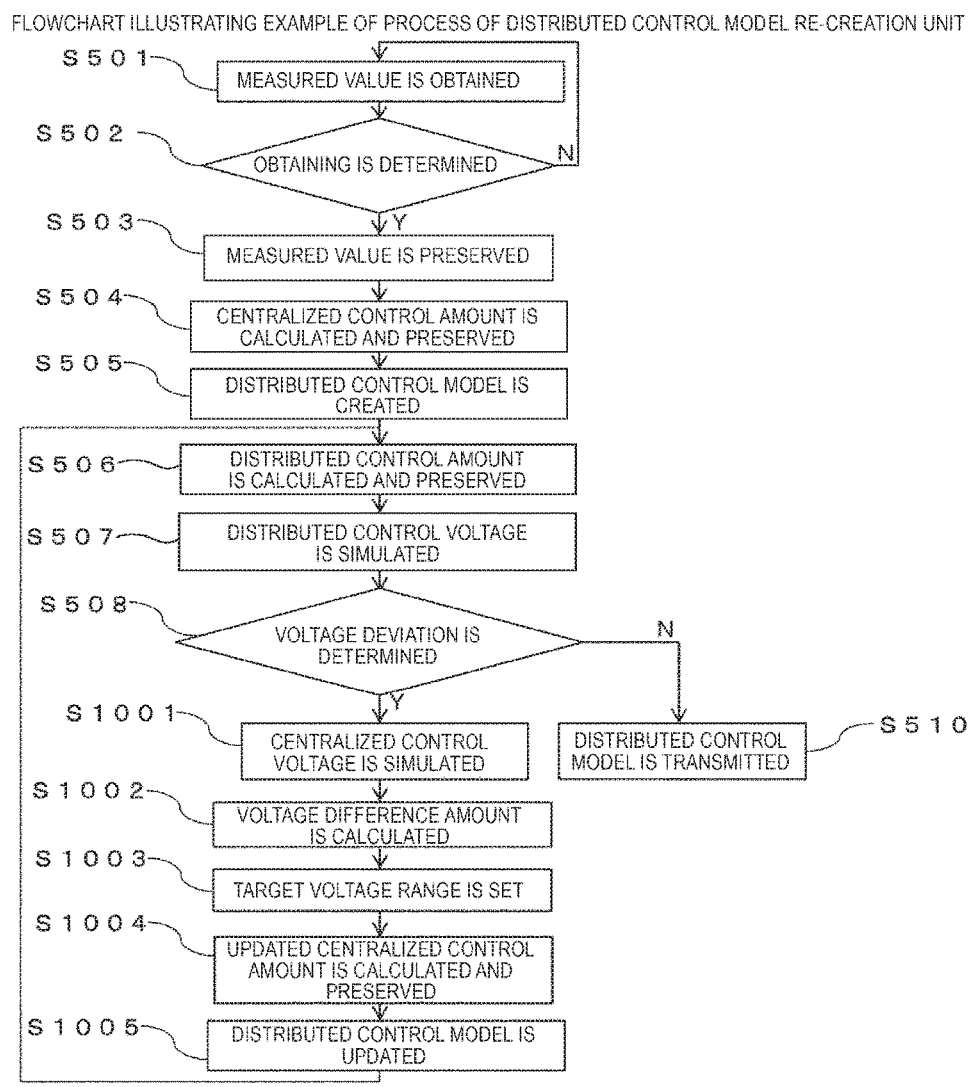

[Fig. 11]

EXAMPLE OF VOLTAGE DIFFERENCE AMOUNT CALCULATION

DISTRIBUTED CONTROL VOLTAGE DISTRIBUTION

| TIME AND DATE | 301a | 301b | 301c | 301d | 301e | 301f |
|---|---|---|---|---|---|---|
| | | | NODE VOLTAGE | | | |
| 2012/12/10 15:30 | 6750 | 6690 | 6670 | 6550 | 6450 | 6350 |
| 2012/12/10 15:00 | 6700 | 6690 | 6685 | 6655 | 6610 | 6560 |
| ... | ... | ... | ... | ... | ... | ... |

CENTRALIZED CONTROL VOLTAGE DISTRIBUTION

| TIME AND DATE | 301a | 301b | 301c | 301d | 301e | 301f |
|---|---|---|---|---|---|---|
| | | | NODE VOLTAGE | | | |
| 2012/12/10 15:30 | 6750 | 6700 | 6680 | 6600 | 6500 | 6450 |
| 2012/12/10 15:00 | 6700 | 6690 | 6680 | 6650 | 6600 | 6550 |
| ... | ... | ... | ... | ... | ... | ... |

VOLTAGE DIFFERENCE AMOUNT

| TIME AND DATE | 301a | 301b | 301c | 301d | 301e | 301f |
|---|---|---|---|---|---|---|
| | | | VOLTAGE DIFFERENCE AMOUNT | | | |
| 2012/12/10 15:30 | 0 | -10 | -10 | -50 | -50 | -100 |
| 2012/12/10 15:00 | 0 | 0 | 5 | 5 | 10 | 10 |
| ... | ... | ... | ... | ... | ... | ... |

[Fig. 12]

EXAMPLE OF VOLTAGE DEVIATION INFORMATION

| TIME AND DATE | VOLTAGE NODE | | | | | | |
|---|---|---|---|---|---|---|---|
| | 301a | 301b | 301c | 301d | 301e | 301f |
| 2012/12/10 15:30 | 0 | 0 | 0 | 0 | 0 | 1 |
| 2012/12/10 15:00 | 0 | 0 | 0 | 0 | 0 | 0 |
| ... | ... | ... | ... | ... | ... | ... |

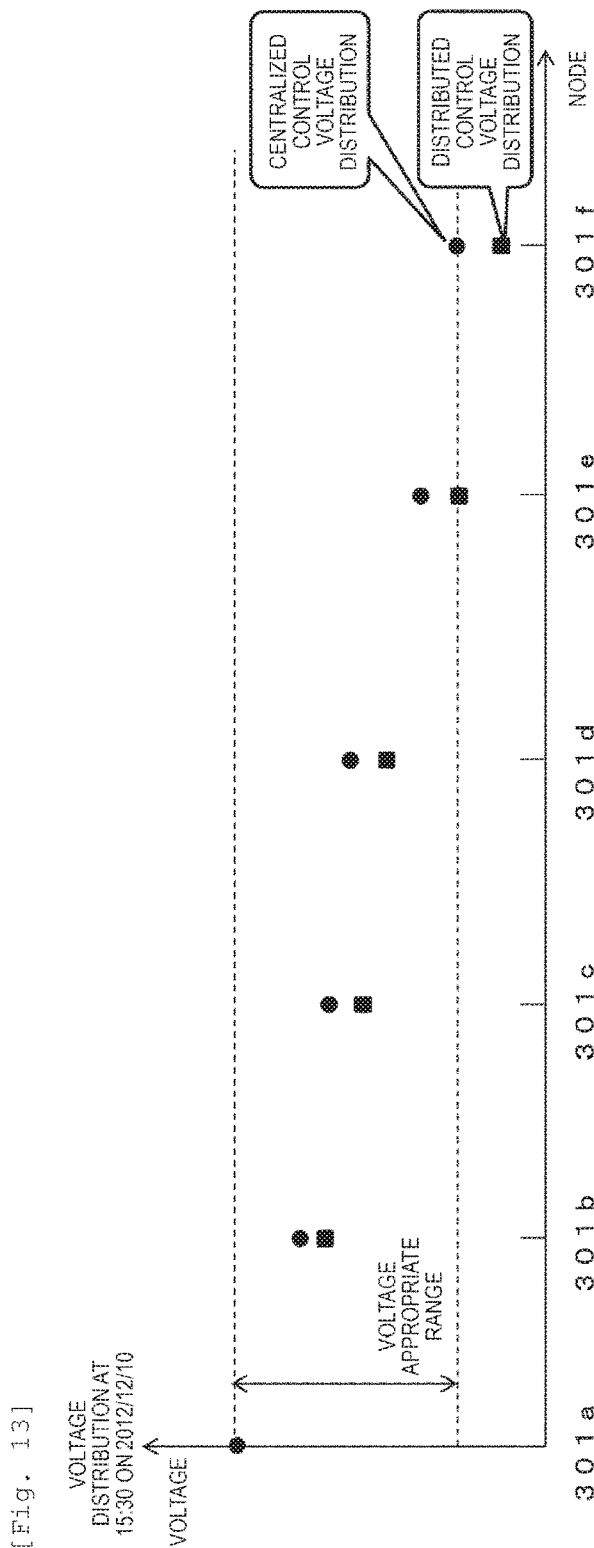

[Fig. 14]

TARGET VOLTAGE RANGE

| NUMBER OF NODE | VOLTAGE UPPER LIMIT [V] | VOLTAGE LOWER LIMIT [V] |
|---|---|---|
| NODE 301a | 6750 | 6450 |
| NODE 301b | 6750 | 6450 |
| NODE 301c | 6750 | 6450 |
| NODE 301d | 6750 | 6450 |
| NODE 301e | 6750 | 6450 |
| NODE 301f | 6750 | 6500 |

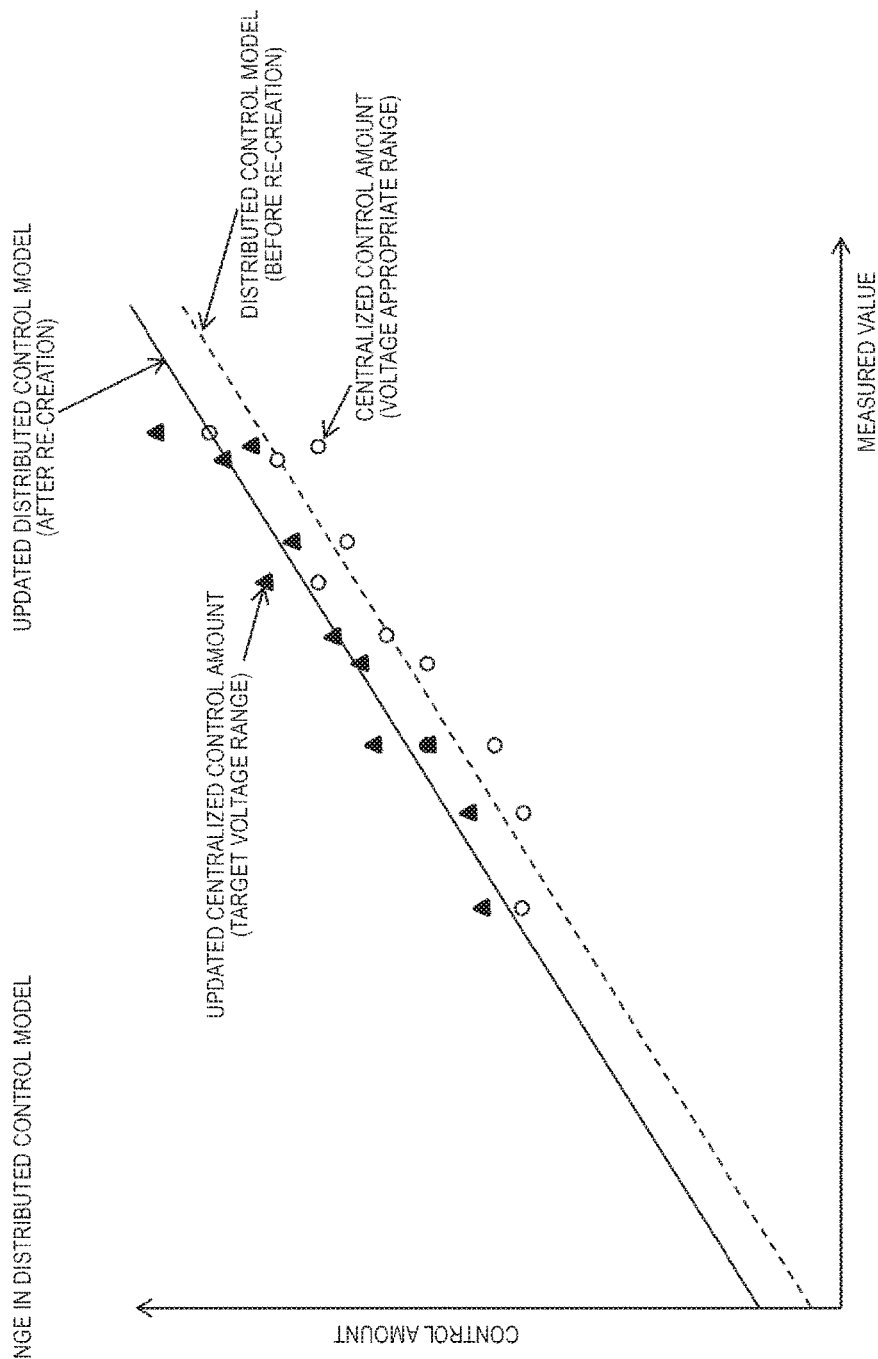
[Fig. 15]
EXAMPLE OF CHANGE IN DISTRIBUTED CONTROL MODEL

[Fig. 16]
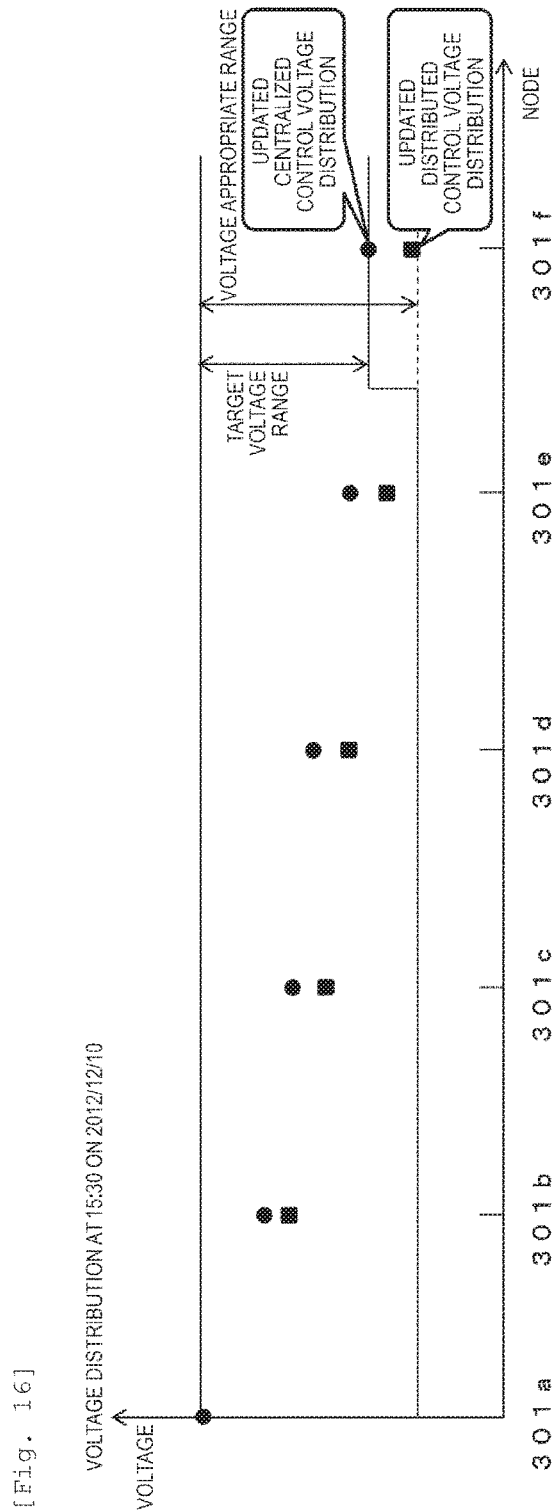

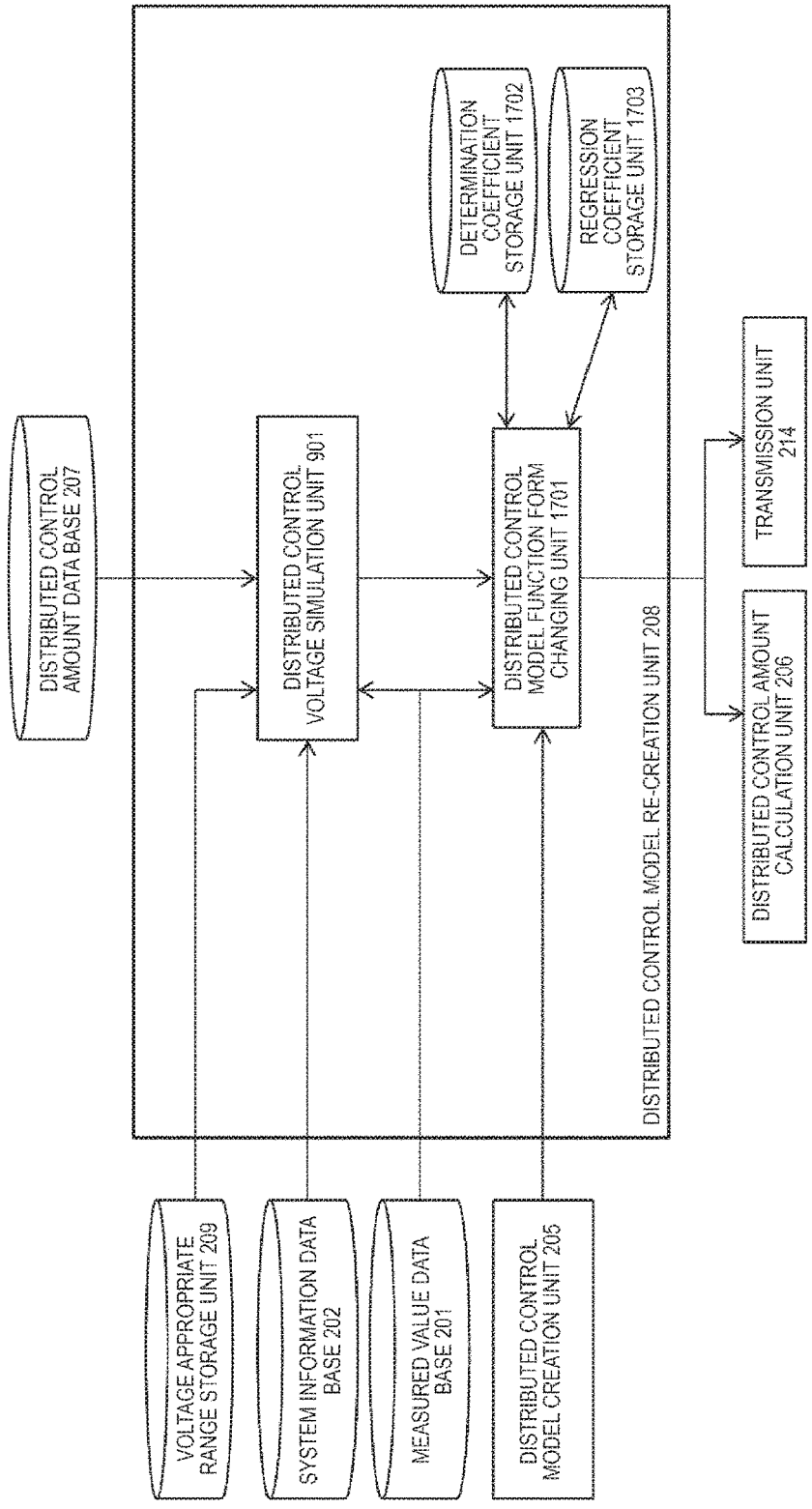
[Fig. 17] DISTRIBUTED CONTROL MODEL RE-CREATION UNIT 208 IN EMBODIMENT 2

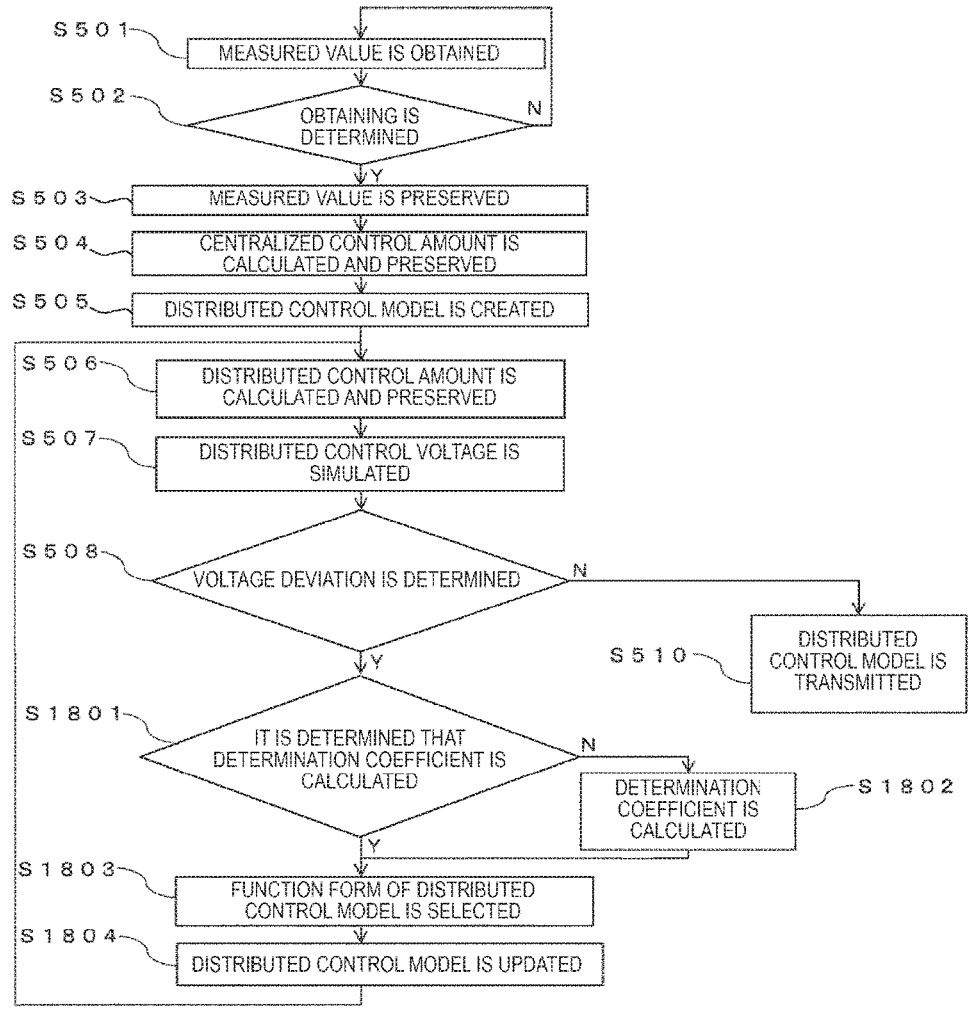

[Fig. 19]

EXAMPLE OF FUNCTION FORM THAT IS HELD IN DISTRIBUTED
CONTROL MODEL FUNCTION FORM UPDATING UNIT 1701 IN
EMBODIMENT 2

| NUMBER OF FUNCTION | FUNCTION FORM |
|---|---|
| 1 | LINEAR FUNCTION |
| 2 | QUADRATIC FUNCTION |
| 3 | CUBIC FUNCTION |
| . . . | . . . |

[Fig. 20]

EXAMPLE OF DISTRIBUTED CONTROL MODEL IN EMBODIMENT 2

| CONTROL DEVICE 104a | NUMBER OF NODE | REGRESSION COEFFICIENT | | | CONSTANT TERM | NUMBER OF FUNCTION |
|---|---|---|---|---|---|---|
| | | A | B | C | | |
| NUMBER OF MEASUREMENT NODE | NODE 301a | 3.0 | -1.8 | | 250 | 1 |
| | NODE 301b | 1.2 | 0.1 | | | |
| | NODE 301c | -1.5 | -0.1 | | | |
| | ... | ... | ... | ... | | |

| NODE 301d | | 2.0 | 0.1 | | | 2 |
|---|---|---|---|---|---|---|
| NUMBER OF MEASUREMENT NODE | ... | ... | ... | | | |

| NODE 301f | | 1.8 | -0.2 | | | 2 |
|---|---|---|---|---|---|---|
| NUMBER OF MEASUREMENT NODE | ... | ... | ... | | | |

...

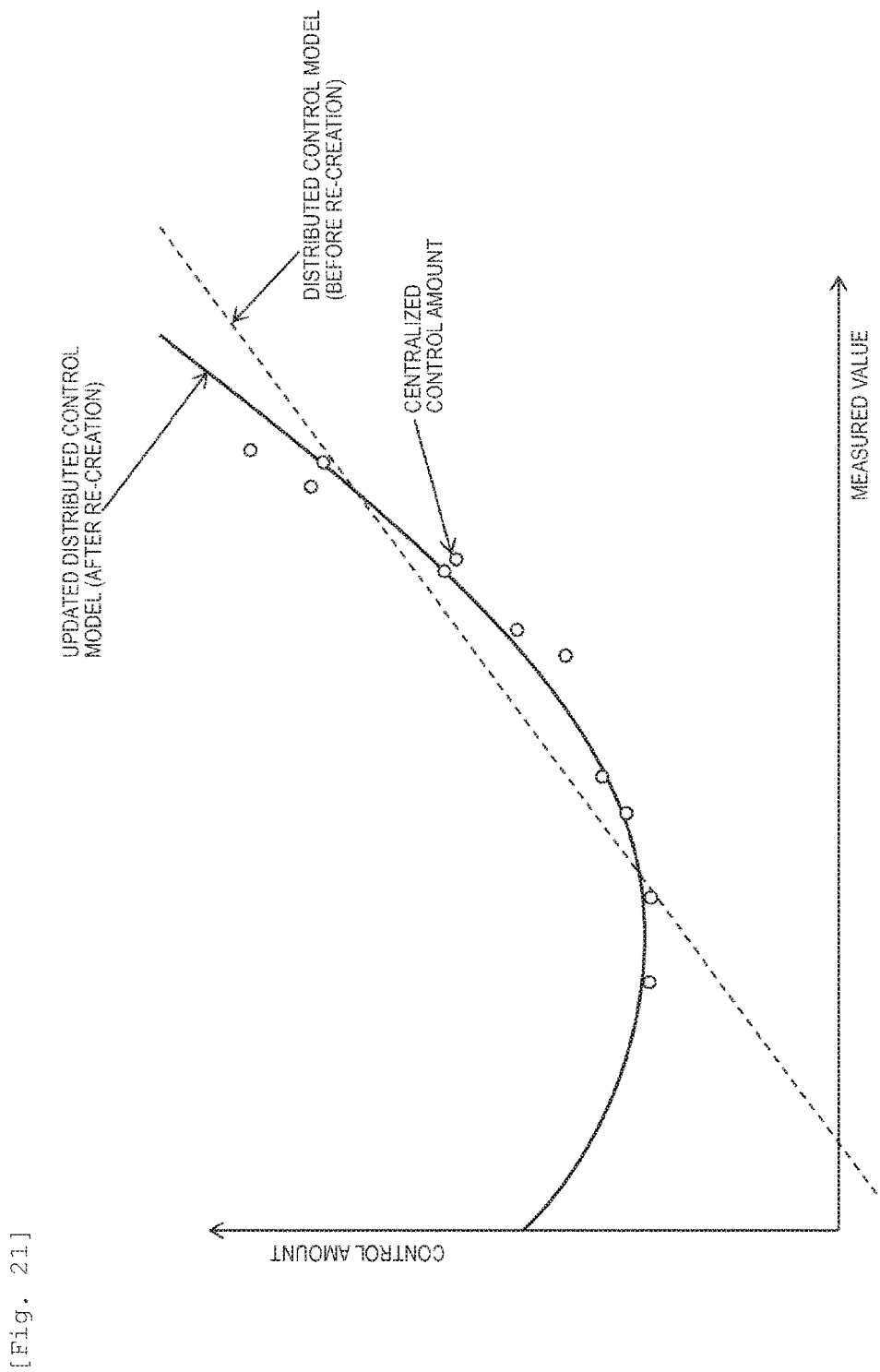
[Fig. 21]

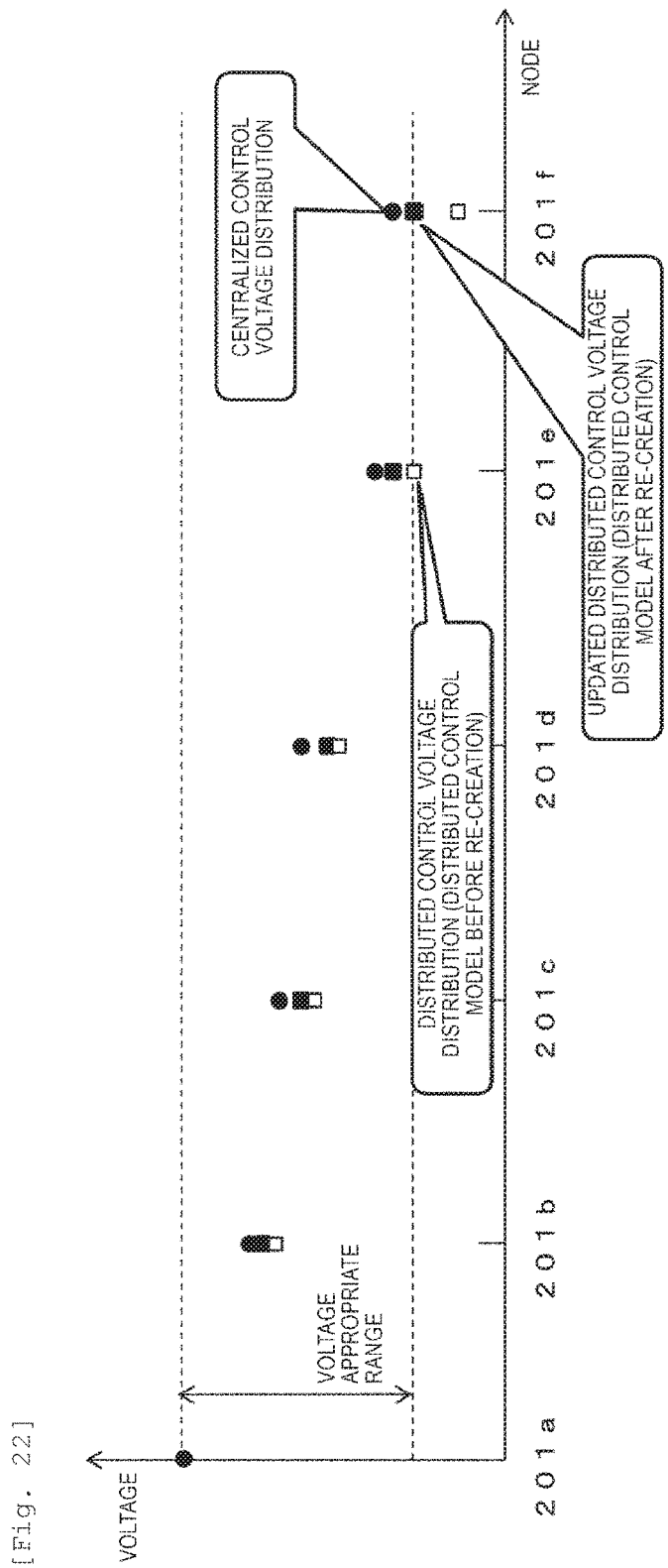

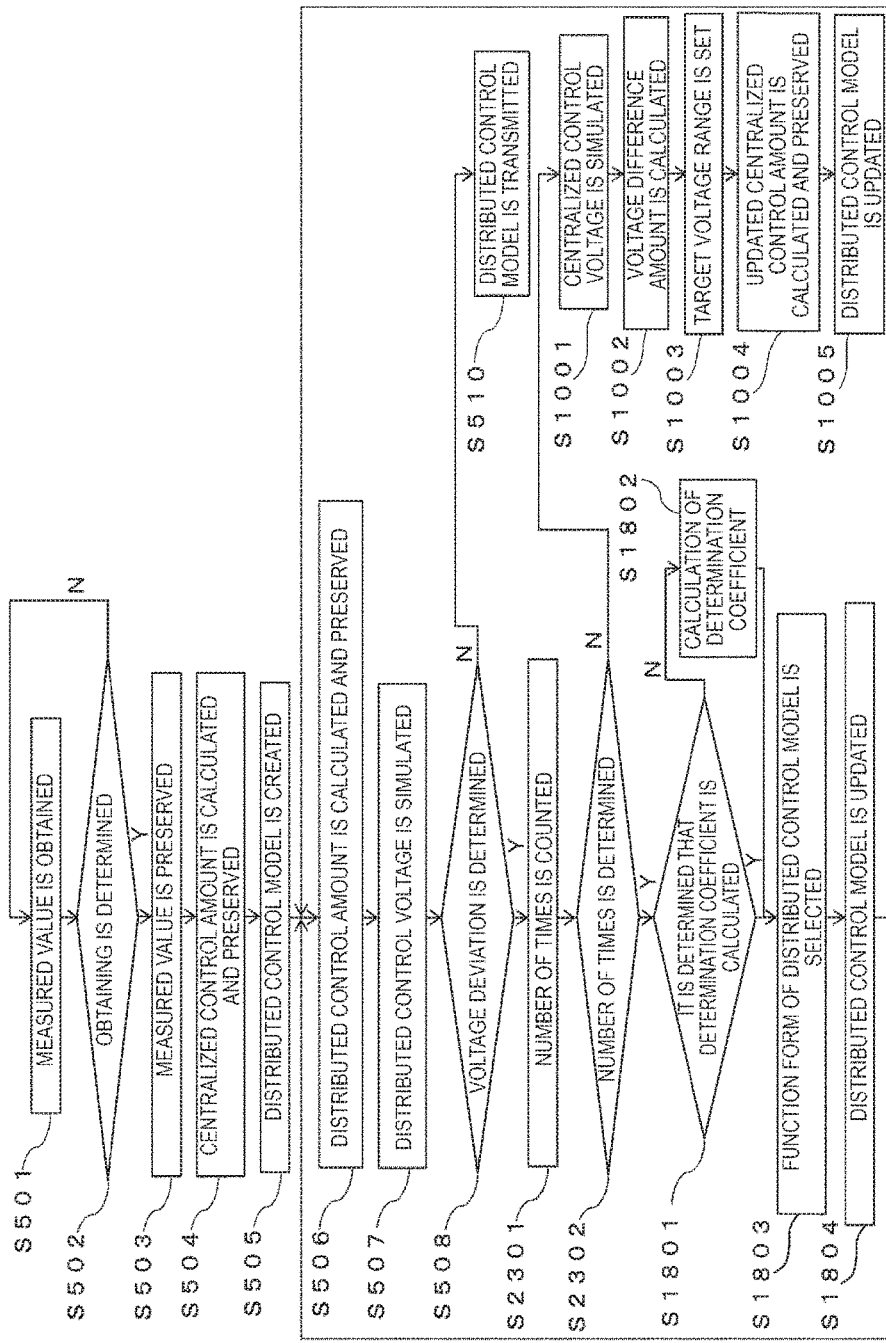

POWER SYSTEM CONTROL INSTRUCTION DEVICE AND METHOD FOR CONTROLLING A VOLTAGE OF A POWER SYSTEM

TECHNICAL FIELD

The present invention relates to a power system control instruction device performing control of a power system.

BACKGROUND ART

In general, in a power system, a voltage of a power system is controlled by a control device such as a Step Voltage Regulator (SVR) or a Static Var Compensator (SVC).

A so-called centralized control, in which a monitor control server collectively grasps a state of an entire power system and applies an optimal control instruction to each control device, is disclosed in PTL 1.

A technique, in which in a case where reactive power passing through the SVR is monitored and the reactive power is continuously measured for a predetermined time or longer, the SVC is estimated to be in operation, and tap switching control of the SVR is performed, is disclosed in PTL 2. The technique is a so-called autonomous distributed control technique in which communication is not assumed.

CITATION LIST

Patent Literature

PTL 1: JP-A-2009-065788
PTL 2: JP-A-2011-217581

SUMMARY OF INVENTION

Technical Problem

In recent years, cookware, a water heater, an air conditioner, a lighting apparatus, and the like in house being served by electricity, a so-called all-electrified house has become popular. Furthermore, a load of a large capacity such as an electric water heater making hot water using electricity which is cheap at night, an electric automobile, and the like have become popular, and diversification of power demand is progressed.

On the other hand, auxiliary power generation by distributed power supply such as solar power generation, a fuel cell, and a home storage battery is performed in various places. A state of the power system particularly, a voltage of a power distribution system is largely fluctuated by such a situation, and it is expected that the fluctuation of the voltage is unlikely to be maintained within an appropriate range (101±6 V or 202±20 V) that is defined by the Electricity Business Act.

In the related art, the fluctuation of the voltage of a local end (position to which the control device is connected) is suppressed within an appropriate range by the control device such as the SVR or the SVC. However, the SVR or the SVC is operated basically independently and is not operated in conjunction with adjacent other control devices. Therefore, if a load of a large capacity is provided in the power system or various types of distributed power supply are connected to the power system, it may be difficult to suppress the fluctuation of the voltage of the power system within the appropriate range.

The technique described in PTL 1 is effective in a case where a communication environment between the monitor control server and each control device is stable and communication of high speed and high quality can be performed. However, for example, in a case where the communication environment of high speed and high quality cannot be available, in the technique described in PTL 1, it is contemplated that transmission of a control instruction from the monitor control server to the control device is delayed or the control instruction is not received. Therefore, the voltage of the power system may be deviated from the appropriate range.

The technique described in PTL 2 is considered to be effective in a case where the SVR is positioned on an upstream side (substation side) of the SVC and a distance therebetween is close. However, in a case of other than such a configuration, in the technique described in PTL 2, it is difficult to estimate an operation of the SVC from measured reactive power and the voltage of the power system may be deviated from the appropriate range. In addition, even in a case where two SVCs or more are connected to the same power system, similarly, it is contemplated that the operation of the SVC is unlikely to be estimated by the SVR and the voltage of the power system may be deviated from the appropriate range.

The invention is made in view of the problem described above and an object thereof is to create a control model which can maintain a voltage of a power system within an appropriate range regardless of quality of communication between a control instruction device that calculates a control amount and a control device that executes a predetermined operation on the basis of the control amount.

Solution to Problem

Then, in order to solve the problems described above, the invention provides a power system control instruction device that performs a control instruction to a control device that controls a power system on the basis of a measured value transmitted from a sensor measuring a state value of the power system, the device including a centralized control amount calculation unit that obtains a centralized control amount using a measured value of the sensor such that a system voltage meets a predetermined control purpose; a distributed control model creation unit that creates a distributed control model using the measured value and the centralized control amount; a distributed control model re-creation unit that determines whether or not a voltage deviation from the voltage appropriate range occurs when the control device performs control on the basis of the distributed control model, and re-creates the distributed control model when the voltage deviation occurs; and a transmission unit that transmits the distributed control model that is re-created to the control device.

Advantageous Effects of Invention

According to the invention, when creating the distributed control model that is used when the control device determines a control amount from sensor information, the distributed control model is re-created in consideration of a voltage control error due to a modeling error. Therefore, the voltage deviation is prevented and the voltage of the power system can be maintained within an appropriate range regardless of quality of communication.

BRIEF DESCRIPTION OF DRAWINGS

FIG. 1 is a system configuration diagram of a power system control system in an embodiment of the invention.

FIG. 2 is a function configuration diagram of the power system control system in the embodiment of the invention.

FIG. 3 is a schematic configuration diagram of a power system network.

FIG. 4 is an example of measured value accumulation data.

FIG. 5 is a flowchart illustrating an example of a process of a control instruction device.

FIG. 6 is an example of a voltage appropriate range.

FIG. 7 is an example of a distributed control model creation.

FIG. 8 is an example of the distributed control model.

FIG. 9 is a configuration diagram of a distributed control model re-creation unit in Embodiment 1.

FIG. 10 is a flowchart illustrating an example of a process of the distributed control model re-creation unit in Embodiment 1.

FIG. 11 is an example of a voltage difference amount calculation in Embodiment 1.

FIG. 12 is an example of voltage deviation information in Embodiment 1.

FIG. 13 is an example of a centralized control voltage distribution and a distributed control voltage distribution in Embodiment 1.

FIG. 14 is an example of a target voltage range in Embodiment 1.

FIG. 15 is an example of a change in a centralized control amount and a distributed control model by setting the target voltage range in Embodiment 1.

FIG. 16 is an example of the centralized control voltage distribution by target voltage range setting and the distributed control voltage distribution using the distributed control model that is re-created in Embodiment 1.

FIG. 17 is a configuration diagram of a distributed control model re-creation unit in Embodiment 2.

FIG. 18 is a flowchart illustrating an example of a process of the distributed control model re-creation unit in Embodiment 2.

FIG. 19 is an example of a function form that is held in the distributed control model function form change unit in Embodiment 2.

FIG. 20 is an example of a distributed control model in Embodiment 2.

FIG. 21 is an example of a distributed control model re-creation in Embodiment 2.

FIG. 22 is an example of a centralized control voltage distribution and a distributed control voltage distribution in Embodiment 2.

FIG. 23 is a flowchart illustrating an example of a process of a control instruction device in Embodiment 3.

DESCRIPTION OF EMBODIMENTS

Embodiment 1

Hereinafter, embodiments of the invention will be described with reference to the drawings.

FIG. 1 is a diagram illustrating a system configuration example of a power system control system 1 including a control instruction device 100. Sensors 102 and control devices 104 are connected to a power system 101. The sensors 102 and the control devices 104 are connected to the control instruction device 100 via a communication circuit 103. The control instruction device 100 is configured of an input unit, a communication unit, a CPU, a RAM, a data base, and program data, and is connected to a display device 105 and a recording device 106. The control device 104 is configured of a controller 107 and a control circuit 108, and the controller 107 is configured of an input unit, a communication unit, a CPU, a RAM, a data base, and program data.

Functions of the program data and the data base in the control instruction device 100 and the controller 107 are described with reference to a function configuration example of the power system control system 1 illustrated in FIG. 2. A state quantity such as a voltage and a current of the power system 101 is measured by the sensor 102 and is input into the control instruction device 100 as a measured value 212 via the communication circuit 103. The control instruction device 100 creates a distributed control model 213 and transmits the distributed control model 213 to the control device 104 via the communication circuit 103. The control device 104 obtains a control amount by inputting a measured value that is locally obtained or a measured value obtained from the sensor 102 into the distributed control model 213 via the communication circuit 103, and controls a voltage of the power system 101.

The control instruction device 100 is configured of a measured value data base 201 that records the measured value 212 obtained via the communication circuit 103; a system information data base 202 that records system information of the power system; a voltage appropriate range storage unit 209 that records a voltage appropriate range that is defined by the Electricity Business Act; a centralized control amount calculation unit 203 that determines a centralized control amount of the control device 104 connected to the power system such that, a power state of the power system, particularly, a voltage meets a voltage appropriate range on the basis of measured value accumulation data recorded in the measured value data base 201, the system information recorded in the system information data base 202, and the voltage appropriate range recorded in the voltage appropriate range storage unit 209; a centralized control amount data base 204 that records the centralized control amount; a distributed control model creation unit 205 that obtains measured value accumulation data from the measured value data base 201 and centralized control amount accumulation data from the centralized control amount data base 204, and creates the distributed control model 213; a distributed control amount calculation unit 206 that calculates a distributed control amount by inputting the measured value accumulation data into the distributed control model 205; a distributed control amount data base 207 that records the distributed control amount; a distributed control model re-creation unit 208 that simulates a voltage distribution in a case where the power system is controlled by the distributed control amount and re-creates the distributed control model 213 by determining occurrence of the voltage deviation in a case where the voltage deviation occurs; and a transmission unit 214 that transmits the distributed control model 213 to the control device 104 via the communication circuit 103. The control instruction device 100 inputs the measured value 212 and outputs the distributed control model 213. Here, the system information recorded in the system information data base 202 is constraint conditions of a system topology, a circuit impedance, and a capacity in the control device connected to the system. In addition, the centralized control amount means a control amount that is instructed when the control instruction device 100 can directly control the control device 104 via the communication circuit 103, and, for example, is determined such that the power state of the power system is obtained from the measured value, the power state, particularly, a voltage is satisfied to be within an appropriate range, and an evaluation function determined from the power state is minimized. On the other hand, the distributed control amount is determined from a measured value of the end thereof and the measured value of the other end which can be obtained by a communication circuit by each controller 107, and means a control amount using for control.

The display device 105 outputs a process and a result of processing of the centralized control amount calculation unit 203, the distributed control model creation unit 205, the distributed control amount calculation unit 206, or the distributed control model re-creation unit 208 on a screen as a numerical value or a graph.

Similarly, the recording device 106 records a process and a result of processing of the centralized control amount calculation unit 203, the distributed control model creation unit 205, the distributed control amount calculation unit 206, or the distributed control model re-creation unit 208 as a system log.

The control device 104 is configured of the controller 107 and the control circuit 108. The controller 107 includes a distributed control model storage unit 210 that stores the distributed control model 213 obtained from the control instruction device 100 via the communication circuit 103. Furthermore, the controller 107 includes a control amount output unit 211 that inputs the measured value obtained from the sensor 102 that is connected thereto or obtained by the sensor 102 connected thereto via the communication circuit 103 into the distributed control model 213, and calculates the control amount. The controller 107 inputs the measured value and outputs the control amount. The control circuit 108 performs voltage control of the power system by switching a tap with respect to the power system or outputting reactive power on the basis of the control amount output by the controller 107.

The communication circuit 103 connects the control instruction device 100, the control device 104, and the sensors 102, and each device transmits and receives various types of information such as the measured value and the distributed control model each other using the communication circuit 103. As a communication medium, for example, a wired line such as a public line such as a telephone line, a local line, a dedicated communication line, and a power line carrier communication line may be provided. Otherwise, wireless such as a mobile telephone communication network, a PHS, commercial radio, a satellite line, a wireless LAN may be provided.

FIG. 3 is a schematic diagram of a power system network 300. The power system network is roughly configured of a plurality of nodes 301 and branches 302. The node 301 corresponds to a substation, a pole transformer, a switch, and the like present on the power system. The branch 302 corresponds to a power line on the power system and impedance corresponding to the power line is set in each of the branches 302. In a case where the nodes 301a to 301f are not particularly distinguished, it refers to as the node 301 and in a case where the branches 302a to 302e are not particularly distinguished, it refers to as the branch 302.

For example, the node 301a is the substation and a sensor 102a and a control device 104a are connected thereto. The node 301b is an electric pole in which the pole transformer is provided, a low-voltage customer is connected thereto via the pole transformer, and a sensor 102b is provided. The node 301c is an electric pole to which a high-voltage customer is connected and a sensor 102c is connected thereto. The node 301d is an electric pole to which dispersed power supply is connected and a sensor 102d is provided. The node 301e is the switch and to which the sensor 102 is connected. The node 301f is an electric pole to which a low-voltage customer is connected via the pole transformer, and to which a sensor 102f and a control device 104b are connected. In the example illustrated in FIG. 3, the sensors 102 are provided in all the nodes 301, but the node 301 having no sensor 102 may be present.

FIG. 4 illustrates an example of measured value accumulation data that is measured by the sensor 102 from the power system, is transmitted to the control instruction device 100 via the control line, and is accumulated in the measured value data base 201. As described above, the node number corresponding to each sensor 102 is determined, the date and time when the measured value 212 is obtained, and the state quantity such as active power and reactive power as the measured value 212 is accumulated in the measured value data base 201. The state quantity accumulated in the data base as the measured value 212 may be a voltage, a current, a power factor, and the like in addition to active power and reactive power. In this case, in a case where the control instruction device 100 has a state estimation function, it is possible to estimate a state quantity of a node having no sensor using the measured value 212. Therefore, the estimated state quantity may be preserved in the measured value data base 201 as the measured value accumulation data. The control instruction device 100 creates the distributed control model 213 using the measured value accumulation data and transmits the distributed control model 213 to the control device 104.

FIG. 5 is a flowchart illustrating an example of a process until the control instruction device 100 obtains the measured value 212, creates and transmits the distributed control model 213.

First, in step S501, the control instruction device 100 collects the measured value 212 from the sensor 102 via the communication circuit 103.

Next, in step S502, it is determined whether the measured value can be obtained. In a case where the measured value can be obtained (Y), the procedure proceeds to step S503. In a case where the measured value cannot be obtained (N), the procedure returns to step S501.

Next, in step S503, the measured value 212 is preserved in the measured value data base 201.

Next, in step S504, the centralized control amount calculation unit 203 calculates the centralized control amount on the basis of the voltage appropriate range, the measured value, and the system information, and preserves the centralized control amount in the centralized control amount data base 204. As illustrated in FIG. 6, the voltage appropriate range is a voltage range in which a voltage in each node 301 is required to be kept and, in a case of Japan, is determined by being converted from a voltage range in a low-voltage system defined by the Electricity Business Act. In a case of overseas, the voltage range may also be directly determined in a high-voltage distribution system and in this case, the voltage appropriate range is the determined range. As described above, the system information is the constraint conditions of the system topology, the circuit impedance, and the control device connected to the system. The constraint conditions of the control device are a capacity in a case of the SVC or the battery, and a tap ratio in a case of the LRT or the SVR. The centralized control amount is determined while calculating the state of the power system from the measured value and the system information so as to satisfy the voltage appropriate range or the constraint conditions of the control device. In this case, for example, a loss caused by a tide flowing through the power system is used as the evaluation function and the centralized control amount of each control device is calculated so as to minimize the evaluation function. As a solution for minimizing the evaluation function, various methods such as a mountain claiming method, a quadratic programming method, and a taboo search may be provided or an appropriate method may be used in accordance with a nature of the evaluation function, a nature of the control amount, and the like.

Next, in step S505, the distributed control model creation unit 205 obtains the measured value accumulation data from the measured value data base 201 and the centralized control amount accumulation data from the centralized control amount data base 204, and creates the distributed control model. A creating method of the distributed control model will be described in detail.

Next, in step S506, the distributed control amount calculation unit 206 inputs the measured value accumulation data into the distributed control model, calculates the distributed control amount, and preserves the distributed control amount in the distributed control amount data base 207.

Processes after step S507 are processes in the distributed control model re-creation unit 208.

In step S507, the distributed control model re-creation unit 208 simulates the voltage distribution in a case where the power system is controlled using the distributed control amount and outputs the voltage distribution to the display device 105 and the recording device 106.

Next, in step S508, in a case where the voltage deviation occurs (Y) in the voltage distribution that is simulated in step S507, the procedure proceeds to step S509. In a case where the voltage deviation does not occur (N), the procedure proceeds to step S510.

In a case where the procedure proceeds to step S510, the transmission unit 214 transmits the distributed control model 213 to each control device 104.

In a case where the procedure proceeds to step S509, the distributed control model re-creation unit 208 re-creates the distributed control model and the procedure returns to step S506.

FIG. 6 illustrates the voltage appropriate range and indicates the number of the node and voltage upper and lower limits in each node.

FIG. 7 illustrates an example of distributed control model creation in the distributed control model creation unit 205. For the distributed control model creation, the measured value accumulation data from the measured value data base 201 is read, the centralized control amount accumulation data from the centralized control amount data base 204 is read, and regression analysis is performed in the measured value accumulation data as an explanatory variable and the centralized control amount accumulation data as an explained variable. A function using when performing the regression analysis may be a linear function or may be a nonlinear function, and for example, in a case where the regression analysis is performed using the linear function, Expression 1 is satisfied.

$$F_i = \sum_{k \in M_1} A_{ik} P_k + \sum_{k \in M_1} B_{ik} Q_k + C_i \quad \text{[Expression 1]}$$

Here, $F_i$ is a control amount of the control device of $i^{th}$, that is, in a case of the SVR, $F_i$ indicates a tap ratio and in a case of the SVC, $F_i$ includes reactive power that is output. $P_k$ and $Q_k$ respectively indicate active power and reactive power in a node k which can be measured by the control device of $i^{th}$. $A_{ik}$, $B_{ik}$, and $C_i$ are regression coefficients determined by the regression analysis. In addition, $M_i$ is a set of nodes which can be measured by the control device of $i^{th}$. Therefore, the regression coefficients $A_{ik}$, $B_{ik}$, and $C_i$ are obtained. In this case, the distributed control model means the regression coefficients $A_{ik}$, $B_{ik}$, and $C_i$ which are obtained by the function form indicated in Expression 1 and the regression analysis. FIG. 7 illustrates graphing for determination of the regression coefficients by the regression analysis. In fact, as indicated in Expression 1, the distributed control model is a hyper-plane extending on a multi-dimensional space, but for the sake of simplicity, one cross-section is taken out and illustrated. As illustrated in the figure, the regression coefficients are determined such that a distance from a set of accumulated data becomes the minimum distance. Therefore, the determined regression coefficients are output as the distributed control model. FIG. 8 illustrates an example of the output distributed control model. As described above, the number of measurement node, the regression coefficients obtained by the regression analysis, and constant terms are output for each control device.

FIG. 9 is an example of a configuration diagram of a distributed control model re-creation unit 208 performing re-creation of the distributed control model by setting a target voltage range.

The distributed control model re-creation unit 208 is configured of a distributed control voltage simulation unit 901 that inputs the measured value accumulation data from the measured value data base 201, the system information from the system information data base 202, and the distributed control amount accumulation data from the distributed control amount data base 207, calculates a distributed control voltage distribution that is a voltage distribution when applying the distributed control amount accumulation data to the control, and determines the presence or absence of the voltage deviation; a centralized control voltage simulation unit 902 that inputs the measured value accumulation data from the measured value data base 201, the system information from the system information data base 202, and the centralized control amount accumulation data from the centralized control amount data base 204, and calculates a centralized control voltage distribution that is a voltage distribution when applying the centralized control amount accumulation data to the control; a voltage difference amount calculation unit 903 that calculates a voltage different amount for each node in each time cross-section with a voltage distribution in a plurality of time cross-sections obtained from a distributed control voltage simulation unit 901 and with a voltage distribution in a plurality of time cross-sections obtained from the centralized control voltage simulation unit 902; a target voltage range setting unit 904 that sets a target voltage range on the basis of the voltage difference amount and the voltage appropriate range; a target voltage range storage unit 908 that records the target voltage range; an updated centralized control amount calculation unit 905 that calculates an updated centralized control amount from a measured value and system information so as to meet the target voltage range; an updated centralized control amount data base 906 that records the updated centralized control amount; and a distributed control model updating unit 907 that creates an updated distributed control model from the measured value accumulation data and an updated centralized control amount accumulation data. The distributed control model re-creation unit 208 outputs the updated distributed control model.

FIG. 10 is a flowchart embodying a process of the distributed control model re-creation unit 208 and illustrating a process of the control instruction device 100.

First in step S501, the control instruction device 100 collects the measured value 212 from the sensor 102 via the communication circuit 103.

Next, in step S502, it is determined whether the measured value can be obtained. In a case where the measured value can be obtained (Y), the procedure proceeds to step S503. In a case where the measured value cannot be obtained (N), the procedure returns to step S501.

Next, in step S503, the measured value 212 is preserved in the measured value data base 201.

Next, in step S504, the centralized control amount calculation unit 203 calculates the centralized control amount on the basis of the voltage appropriate range, the measured value, and the system information, and preserves the centralized control amount in the centralized control amount data base 204.

Next, in step S505, the distributed control model creation unit 205 obtains the measured value accumulation data from the measured value data base 201 and the centralized control amount accumulation data from the centralized control amount data base 204, and creates the distributed control model.

Next, in step S506, the distributed control amount calculation unit 206 inputs the measured value accumulation data into the distributed control model, calculates the distributed control amount, and preserves the distributed control amount in the distributed control amount data base 207.

In step S507, the distributed control model re-creation unit 208 simulates the voltage distribution in a case of controlling the power system using the distributed control amount, and outputs the voltage distribution to the display device 105 and the recording device 106.

Next, in step S508, in a case where the voltage deviation occurs (Y) in the voltage distribution that is simulated in step S507, the procedure proceeds to step S1001. In a case where the voltage deviation does not occur (N), the procedure proceeds to step S510.

In a case where the procedure proceeds to step S510, the transmission unit 214 transmits the distributed control model 213 to each control device 104.

In step S1001, the centralized control voltage simulation unit 902 inputs the system information from the system information data base 202, the measured value accumulation data from the measured value data base 201, and the centralized control amount accumulation data from the centralized control amount data base 204, and calculates the centralized control voltage distribution that is the voltage distribution in a case where the centralized control amount accumulation data is applied to the control.

Next, in step S1002, the voltage difference amount between the distributed control voltage distribution and the centralized control voltage distribution is calculated, and a time when the voltage deviation occurs in the voltage distribution in a case where the distributed control amount accumulation data is applied to the control and a node are obtained as voltage deviation information. FIG. 11 illustrates an example of a voltage distribution difference amount calculated by the voltage difference amount calculation unit 903. As described above, the voltage difference amount is obtained by subtracting the voltage distribution in a case where the centralized control amount accumulation data is applied to the control from the voltage distribution in a case where the distributed control amount accumulation data is applied to the control for each node in each time cross-section. The voltage deviation information and the voltage difference amount are recorded in the recording device 106 and are displayed as numerical values or graphs in the display device 105. In addition, FIG. 12 illustrates an example of the voltage deviation information. In the example of the voltage distribution illustrated in FIG. 11, since the node 301f is deviated at 15:30 on 2012/12/10, a value of the node 301f is changed from 0 to 1 at 15:30 on 2012/12/10 and a voltage deviation flag is raised. FIG. 13 illustrates the voltage distribution at 15:30 on 2012/12/10, but, for example, a graph illustrated in FIG. 13 may be displayed in the display device 105.

Next, in step S1003, the target voltage range setting unit 904 obtains the voltage deviation information and the voltage difference amount from the voltage difference amount calculation unit 903, and the voltage appropriate range from the voltage appropriate range storage unit 209, and sets the target voltage range by subtracting the voltage difference amount from the voltage appropriate range in the number of the node in which the voltage deviation flag is raised. Specifically, in a case where the voltage difference amount is positive, the voltage difference amount is subtracted from an upper limit of the voltage appropriate range and in a case where the voltage difference amount is negative, an absolute value of the voltage difference amount is added to a lower limit of the voltage appropriate range. For example, a case where the voltage appropriate range is 6450 V to 6750 V in the node 301f may be considered. In a case where the voltage deviation occurs in the node 301f in the voltage distribution in a case where the distributed control amount accumulation data is applied to the control, if the voltage difference amount is 50 V in the node 301f, the target voltage range in the node 301f is set to 6450 V to 6700 V. In contrast, if the voltage difference amount is −50 V in the node 301f, the target voltage range in the node 301f is set to 6500 to 6750 V. The target voltage range that is set is recorded in the target voltage range storage unit 908 and the recording device 106, and is displayed in the display device 105 as numerical values or a graph. FIG. 14 illustrates an example of the target voltage range.

Next, in step S1004, the updated centralized control amount calculation unit 905 obtains the system information from the system information data base 202, the measured value accumulation data from the measured value data base 201, and the target voltage range from the target voltage range storage unit 908, and obtains the updated centralized control amount so as to meet the target voltage range, and records the updated centralized control amount on the updated centralized control amount data base 906. The calculation executed in the updated centralized control amount calculation unit 905 is similar to the calculation executed in the centralized control amount calculation unit 203.

Next, in step S1005, the distributed control model updating unit 907 obtains the measured value accumulation data from the measured value data base 201 and the updated centralized control amount accumulation data from the updated centralized control amount data base 906, and calculates the distributed control model similar to the distributed control model creation unit 205.

FIG. 15 illustrates an example of a change in the distributed control model by updating the distributed control model after setting the target voltage range in the distributed control model re-creation unit 208. As an example, a case where the lower limit of the target voltage range is set to be higher than the lower limit of the voltage appropriate range by 50 V is illustrated. The distributed control model is a hyper-plane extending on a multi-dimensional space, but for the sake of simplicity, one cross-section is taken out and illustrated. A horizontal axis is a measured value and the vertical axis is a control amount. The centralized control amount calculated on the basis of the voltage appropriate range is plotted with outlined circles and the updated centralized control amount calculated on the basis of the target voltage range that is newly set is plotted with black triangles. As described above, the updated centralized control amount determined on the basis of the target voltage range indicates a tendency to be higher than the centralized control amount determined on the basis of the voltage appropriate range by setting the lower limit of the target voltage range higher than the voltage appropriate range. Then, the updated distributed control model that is re-created also indicates a tendency to output the control amount larger than that of the distributed control model before re-creation by performing the regression analysis with respect to the centralized control amount determined on the basis of the target voltage range.

FIG. 16 illustrates an example of an updated centralized control voltage distribution that is a voltage distribution in a case where control is performed by the updated centralized control amount determined on the basis of the target voltage range and an updated distributed control voltage distribution that is a voltage distribution in a case where control is performed by the updated distributed control amount that is obtained by re-created updated distribution control model. As described above, the updated centralized control amount is determined so as to be kept in the target voltage range and updated centralized control voltage distribution is kept within the target voltage range by setting the target voltage range. On the other hand, there is a node in which the updated distributed control voltage distribution is not kept within the target voltage range, but the distributed control amount is corrected upward by re-creation of the distributed control model. As a result, since the voltage distribution is corrected upward, the voltage distribution is kept within the voltage appropriate range and the voltage deviation does not occur.

Embodiment 2

In Embodiment 2, an example of a case where a distributed control model re-creation unit 208 does not perform updating of a distributed control model by setting a target voltage range, but performs updating thereof by changing a function form using in a regression analysis will be described. A function configuration diagram of a power system control system in Embodiment 2 is the same as that of FIG. 2. The power system 101, the sensor 102, the communication circuit 103 of FIG. 2, the measured value data base 201, the system information data base 202, the centralized control amount calculation unit 203, the centralized control amount data base 204, the distributed control model creation unit 205, the distributed control amount data base 207, the transmission unit 214 in the control instruction device 100, the control circuit 108 in the control device 104 are the same as those of Embodiment 1, but functions of the distributed control amount calculation unit 206, the distributed control model re-creation unit 208, and the controller 207 are different from those thereof. Hereinafter, first, the function of the distributed control model re-creation unit 208 will be described.

FIG. 17 is an example of a configuration diagram of the distributed control model re-creation unit 208 in Embodiment 2. The distributed control model re-creation unit 208 is configured of the same distributed control voltage simulation unit 901 as that of Embodiment 1, a distributed control model function form updating unit 1701 that updates the distributed control model by changing the function form of the distributed control model, a determination coefficient storage unit 1702, and a regression coefficient storage unit 1703. The distributed control model re-creation unit 208 outputs the distributed control model. Here, the distributed control model function form updating unit 1701 holds a plurality of function forms for using in the regression analysis on an inside thereof.

FIG. 18 illustrates a flowchart of a process of the control instruction device 100 by embodying a process of the distributed control model re-creation unit 208 in Embodiment 2.

First, in step S501, the control instruction device 100 collects the measured value 212 from the sensor 102 via the communication circuit 103.

Next, in step S502, it is determined whether the measured value can be obtained. In a case where the measured value can be obtained (Y), the procedure proceeds to step S503. In a case where the measured value cannot be obtained (N), the procedure returns to step S501.

Next, in step S503, the measured value 212 is preserved in the measured value data base 201.

Next, in step S504, the centralized control amount calculation unit 203 calculates the centralized control amount on the basis of the voltage appropriate range, the measured value, and the system information, and preserves the centralized control amount in the centralized control amount data base 204.

Next, in step S505, the distributed control model creation unit 205 obtains the measured value accumulation data from the measured value data base 201 and the centralized control amount accumulation data from the centralized control amount data base 204, and creates the distributed control model.

Next, in step S506, the distributed control amount calculation unit 206 calculates the distributed control amount by inputting the measured value accumulation data into the distributed control model and preserves the distributed control amount in the distributed control amount data base 207.

In step S507, the distributed control model re-creation unit 208 simulates the voltage distribution in a case where the power system is controlled using the distributed control amount and outputs the voltage distribution to the display device 105 and the recording device 106.

Next, in step S508, in a case where the voltage deviation occurs (Y) in the voltage distribution that is simulated in step S507, the procedure proceeds to step S1801. In a case where the voltage deviation does not occur (N), the procedure proceeds to step S510.

In a case where the procedure proceeds to step S510, the transmission unit 214 transmits the distributed control model 213 to each control device 104.

In step S1801, the distributed control model function form changing unit 1701 reads the determination coefficient from the determination coefficient storage unit 1702 and determines whether the determination coefficient is calculated. After the measured value is obtained in step S501, in a case of the process of initial step S1801, NULL or 0 is preserved as the determination coefficient. Therefore, since it can be seen that the determination coefficient is not calculated (N), the procedure proceeds to step S1802. In a case where a numerical value other than 0 is preserved as the determination coefficient, the determination coefficient is calculated (Y), and thereby the procedure proceeds to step S1803.

In step S1802, the distributed control model function form changing unit 1701 performs the regression analysis using each function form that is preserved, obtains the determination coefficient and the regression coefficient, and preserves each of the determination coefficient and the regression coefficient in the determination coefficient storage unit 1702 and the regression coefficient storage unit 1703.

In step S1803, the distributed control model function form changing unit 1701 obtains the determination coefficient from the determination coefficient storage unit 1702, selects a function form of which the determination coefficient is the greatest, and reads the regression coefficient corresponding to the function form from the regression coefficient storage unit 1703. In this case, the reading flag is raised in the data within the determination coefficient storage unit 1702 with respect to the selected function form.

In step S1804, the distributed control model is updated by the regression coefficient and the number of the function in the selected function form in step S1803. The number of the functions is the number that is set so as to correspond to each function form, for example, a linear function is 1 and a quadratic function is 2 as illustrated in FIG. 19.

Thereafter, the procedure returns to step S506 and in step S508, the voltage deviation determination is performed again. As a result of the voltage deviation determination, in a case where the voltage deviation occurs (Y), the procedure proceeds to step S1801, but, since the determination coefficient is calculated in the initial process, the procedure proceeds to step S1803.

In step S1803, the function form of which the determination coefficient is the greatest is selected among the function forms in which the reading flag is not raised, and the regression coefficient corresponding to the function form is read from the regression coefficient storage unit 1703. In this case, the reading flag is also raised in the data within the determination coefficient storage unit 1702 with respect to the selected function form.

Then, in step S1804, the distributed control model is updated and the procedure proceeds to step S506.

In the voltage deviation determination in step S508, in a case where the distributed control voltage distribution is not voltage-deviated with respect to the voltage appropriate range (N), the procedure proceeds to step S510, but, in this case, data within the determination coefficient storage unit 1702 is initialized. As described above, selection of the function form on the basis of the determination coefficient in step S1703 and the voltage deviation determination with respect to the function in step S508 are executed as a loop process and thereby it is possible to efficiently select a function of which the determination coefficient is great among the function forms which are not voltage-deviated.

FIG. 20 illustrates an example of the distributed control model output in step S804. According to the example, the distributed control model to the control device 104a is a linear function of which the number of the function is 1 and the distributed control model to the control device 104b is a quadratic function of which the number of the function is 2.

On the other hand, the distributed control amount calculation unit 206 in Embodiment 2 holds the same function form as that which is held in the distributed control model function form changing unit 1701 as illustrated in FIG. 19, and performs the calculation of the distributed control amount by applying the function form corresponding to the number of the function given to the distributed control model obtained from the control instruction device 100. In addition, the controller 107 also has the same function as that of the distributed control amount calculation unit 206.

As an example, here, the linear function and the quadratic function are considered as the function form of the distributed control model, but other function forms such as a cubic function and a quartic function may be provided.

FIG. 21 illustrates an example of updating of the function form of the distributed control model as a graph. Also, here, only one cross-section is taken out from a multi-dimensional space. As an example, as illustrated in the figure, a case where the centralized control amount with respect to the measured value is distributed is considered. In a case where the distributed control model is the linear function, a portion deviated from an original data point occurs. Meanwhile, in a case where the distributed control model is created as the quadratic function, the updated distributed control model is able to represent well the original data and it can be seen that an error due to modeling is reduced.

FIG. 22 illustrates an example of an effect to the voltage control by updating the function form of the distributed control model. Black circles are the centralized control voltage distribution, white squares are the distributed control voltage distribution in a case where the distributed control model before re-creation is applied to the control, and black squares are the updated distributed control voltage distribution in a case where the updated distributed control model after re-creation is applied to the control. As illustrated in FIG. 21, in a case where the distributed control model before re-creation is applied to the control, the voltage distribution has a large deviation from the centralized control voltage distribution and the voltage deviation occurs. Meanwhile, since the error due to modeling can be suppressed by appropriately selecting the function form, the distributed control voltage distribution after re-creation has a small deviation from the centralized control voltage distribution and the voltage deviation does not occur.

Embodiment 3

In the embodiment, in a case where the voltage deviation is not solved by setting the target voltage range by a combination of Embodiment 1 and Embodiment 2, an example of the distributed control model re-creation unit 208 which re-creates the distributed control model by changing the function form using in the regression analysis is described.

FIG. 23 is a flowchart embodying an example of a process of the distributed control model re-creation unit 208 in Embodiment 3 and a process of the control instruction device 100.

First, in step S501, the control instruction device 100 collects the measured value 212 from the sensor 102 via the communication circuit 103.

Next, in step S502, it is determined whether the measured value can be obtained. In a case where the measured value can be obtained (Y), the procedure proceeds to step S503. In a case where the measured value cannot be obtained (N), the procedure returns to step S501.

Next, in step S503, the measured value 212 is preserved in the measured value data base 201.

Next, in step S504, the centralized control amount calculation unit 203 calculates the centralized control amount on the basis of the voltage appropriate range, the measured value, and the system information, and preserves the centralized control amount in the centralized control amount data base 204.

Next, in step S505, the distributed control model creation unit 205 obtains the measured value accumulation data from the measured value data base 201 and the centralized control amount accumulation data from the centralized control amount data base 204, and creates the distributed control model.

Next, in step S506, the distributed control amount calculation unit 206 calculates the distributed control amount by inputting the measured value accumulation data into the distributed control model and preserves the distributed control amount in the distributed control amount data base 207.

In step S507, the distributed control model re-creation unit 208 simulates the voltage distribution in a case where the power system is controlled using the distributed control amount and outputs the voltage distribution to the display device 105 and the recording device 106.

Next, in step S508, in a case where the voltage deviation occurs (Y) in the voltage distribution that is simulated in step S507, the procedure proceeds to step S2301. In a case where the voltage deviation does not occur (N), the procedure proceeds to step S510.

In a case where the procedure proceeds to step S510, the transmission unit 214 transmits the distributed control model 213 to each control device 104.

In step S2301, the distributed control voltage simulation unit 901 counts the number of times of YES in the voltage deviation determination of step S508.

In step S2302, the number of times that is counted is determined, if in a case where the number of times reaches an upper limit that is set in advance (Y), the procedure proceeds to step S1801, and if in a case where the number of times does not reach the upper limit (N), the procedure proceeds to step S1001.

In step S1001, the centralized control voltage simulation unit 902 inputs the system information from the system information data base 202, the measured value accumulation data from the measured value data base 201, and the centralized control amount accumulation data from the centralized control amount data base 204, and calculates the centralized control voltage distribution that is the voltage distribution in a case where the centralized control amount accumulation data is applied to the control.

Next, in step S1002, the voltage difference amount of the distributed control voltage distribution and the centralized control voltage distribution is calculated, and a time and a node in which the voltage deviation occurs in the voltage distribution in a case where the distributed control amount accumulation data is applied to the control are obtained as the voltage deviation information.

Next, in step S1003, the target voltage range setting unit 904 obtains the voltage deviation information and the voltage difference amount from the voltage difference amount calculation unit 903, and the voltage appropriate range from the voltage appropriate range storage unit 209, and sets the target voltage range by subtracting the voltage difference amount from the voltage appropriate range in the number of the node in which the voltage deviation flag is raised.

Next, in step S1004, the updated centralized control amount calculation unit 905 obtains the system information from the system information data base 202, the measured value accumulation data from the measured value data base 201, and the target voltage range from the target voltage range storage unit 908, obtains the updated centralized control amount so as to meet the target voltage range, and records the updated centralized control amount on the updated centralized control amount data base 906.

Next, in step S1005, the distributed control model updating unit 907 obtains the measured value accumulation data from the measured value data base 201 and the updated centralized control amount accumulation data from the updated centralized control amount data base 906, and calculates the distributed control model similar to the distributed control model creation unit 205.

In step S1801, the distributed control model function form changing unit 1701 reads the determination coefficient from the determination coefficient storage unit 1702 and determines whether the determination coefficient is calculated. After the measured value is obtained in step S501, in a case of the process of initial step S1801, since NULL or 0 is preserved as the determination coefficient, it can be seen that the determination coefficient is not calculated (N), and then the procedure proceeds to step S1802. In a case where a numerical value other than 0 is preserved as the determination coefficient, the determination coefficient is calculated (Y), the procedure proceeds to step S1803.

In step S1802, the distributed control model function form changing unit 1701 performs the regression analysis using each function form that is preserved, obtains the determination coefficient and the regression coefficient, and preserves each thereof in the determination coefficient storage unit 1702 and the regression coefficient storage unit 1703.

In step S1803, the distributed control model function form changing unit 1701 obtains the determination coefficient from the determination coefficient storage unit 1702, selects the function form of which the determination coefficient is the greatest, and reads the regression coefficient corresponding to the function form from the regression coefficient storage unit 1703. In this case, the reading flag is raised in the data within the determination coefficient storage unit 1702 with respect to the selected function form.

In step S1804, the distributed control model is updated by the regression coefficient and the number of the function in the function form selected in step S1803. As illustrated in FIG. 19, the number of the function is the number that is set so as to correspond to each function form, for example, the linear function is 1 and the quadratic function is 2.

Thereafter, the procedure proceeds to step S506 and the voltage deviation determination is performed again in step S508. As a result of the voltage deviation determination, in a case where the voltage deviation occurs (Y), the procedure proceeds to step S1801, but, since the determination coefficient is calculated in the initial process, the procedure proceeds to step S1803.

In step S1803, the function form of which the determination coefficient is the greatest is selected among the function forms on which the reading flag is not raised, and the regression coefficient corresponding to the function form is read from the regression coefficient storage unit 1703. In this case, the reading flag is also raised in the data within the determination coefficient storage unit 1702 with respect to the selected function form.

Then, the distributed control model is updated in step S1804 and the procedure returns to step S506.

In the voltage deviation determination in step S508, in a case where the distributed control voltage distribution is not voltage-deviated with respect to the voltage appropriate range (N), the procedure proceeds to step S510. In this case, the data within the determination coefficient storage unit 1702 and the number of count times are initialized.

Therefore, in a case where the voltage deviation is not solved by setting the target voltage range, the distributed control model is re-created by changing the function form using the regression analysis. Therefore, it is possible to solve the voltage deviation.

In addition, even in a case where the communication circuit 103 is absent, if the sensor 102 holds the storage device that stores each measured value, it is possible to perform the invention. The measured values held by the storage devices of the sensors 102 are periodically collected by a person and are input into the measured value data base 105. The process within the control instruction device 100 is the same in those indicated in Embodiments 1 to 3, but the distributed control model cannot be transmitted to the control device 104 via the communication circuit. Therefore, updating of the distributed control model in the control device 104 is periodically performed by a person. It is possible to perform Embodiments 1 and 2 via the hand of a person.

REFERENCE SIGNS LIST 100 control instruction device
101 power system
102 sensor
103 communication circuit
104 control device
105 display device
106 recording device
107 controller
108 control circuit
201 measured value data base
202 system information data base
203 centralized control amount calculation unit
204 centralized control amount data base
205 distributed control model creation unit
206 distributed control amount calculation unit
207 distributed control amount data base
208 distributed control model re-creation unit
209 voltage appropriate range storage unit
210 distributed control model storage unit
211 control amount output unit
212 measured value
213 distributed control model
214 transmission unit
300 power system network
301 node
302 branch
901 distributed control voltage simulation unit
902 centralized control voltage simulation unit
903 voltage difference amount calculation unit
904 target voltage range setting unit
905 updated centralized control amount calculation unit
906 updated centralized control amount data base
907 distributed control model updating unit
1701 distributed control model function form changing unit
1702 determination coefficient storage unit
1703 regression coefficient storage unit

The invention claimed is:

1. A power system control instruction device that performs a control instruction to a control device that controls a power system on the basis of a measured value transmitted from a sensor measuring a state value of the power system, the power system control instruction device comprising:
 a computer-readable storage device; and
 a processor configured to:
  obtain a centralized control amount using a measured value of the sensor such that a system voltage of the power system meets a predetermined control purpose;
  create a distributed control model using the measured value of the sensor and the centralized control amount in order to maintain the system voltage of the power system within a predetermined range regardless of quality of communication between the power system control instruction device and the control device;
  determine whether or not a voltage deviation from a voltage appropriate range occurs when the control device performs control on the basis of the distributed control model, and re-creates the distributed control model when the voltage deviation occurs; and
  transmit the distributed control model that is re-created to the control device.

2. The power system control instruction device according to claim 1,
 wherein the distributed control model is a regression coefficient that is determined by linear regression of which inputs are the measured value and the centralized control amount.

3. The power system control instruction device according to claim 1,
 wherein the distributed control model is a function form with a regression coefficient that is determined by a non-linear regression of which inputs are the measured value and the centralized control amount.

4. The power system control instruction device according to claim 1,
 wherein the control purpose is to cause the system voltage to be close to a predetermined target value.

5. The power system control instruction device according to claim 1,
 wherein the processor is configured to obtain an updated centralized control amount on the basis of a voltage difference in a case where the control device is controlled on the basis of the centralized control amount and a case where the control device is controlled on the basis of the distributed control model, and re-create the distributed control model using the measured value and the updated centralized control amount.

6. The power system control instruction device according to claim 1,
 wherein the processor is configured to re-create the distributed control model on the basis of a function form different from the function form that is used in the processor using the measured value and the centralized control amount.

7. The power system control instruction device according to claim 1, further comprising:
 a recording device that outputs the distributed control model and a distributed control model that is re-created to a recording medium.

8. A method for performing a control instruction to a control device that controls a power system on the basis of a measured value transmitted from a sensor measuring a state value of the power system by way of a power system control instruction device including a computer-readable storage device, the method comprising:
 obtaining, via a processor, a centralized control amount using a measured value of the sensor such that a system voltage of the power system meets a predetermined control purpose;
 creating, via the processor, a distributed control model using the measured value of the sensor and the centralized control amount in order to maintain the system voltage of the power system within a predetermined range regardless of quality of communication between the power system control instruction device and the control device;
 determining, via the processor, whether or not a voltage deviation from the voltage appropriate range occurs when the control device performs control on the basis of the distributed control model, and re-creating the distributed control model when the voltage deviation occurs; and transmitting, via the processor, the distributed control model that is re-created to the control device.

* * * * *